United States Patent [19]

Yoshida et al.

[11] Patent Number: 5,534,237

[45] Date of Patent: Jul. 9, 1996

[54] METHOD OF CLEANING AN EXHAUST GAS AND EXHAUST GAS CLEANER THEREFOR

[75] Inventors: Kiyohide Yoshida; Gyo Muramatsu; Akira Abe, all of Kumagaya; Tatsuo Miyadera, Tsukuba, all of Japan

[73] Assignees: Kubushiki Kaisha Riken, Tokyo; Shunso Ishishara, Director–General of Agency Of Industrial Science And Technology, Ibaraki-ken, both of Japan

[21] Appl. No.: 428,635

[22] Filed: Apr. 25, 1995

Related U.S. Application Data

[63] Continuation of Ser. No. 104,894, Aug. 12, 1993, which is a continuation-in-part of Ser. No. 916,409, Jul. 21, 1992, abandoned.

[30] Foreign Application Priority Data

| Jul. 23, 1991 | [JP] | Japan | 3-206529 |
| Sep. 30, 1991 | [JP] | Japan | 3-280476 |
| Sep. 30, 1991 | [JP] | Japan | 3-280479 |
| Sep. 30, 1991 | [JP] | Japan | 3-280482 |
| Sep. 30, 1991 | [JP] | Japan | 3-280825 |
| Feb. 25, 1992 | [JP] | Japan | 4-73399 |
| Apr. 30, 1992 | [JP] | Japan | 4-137959 |
| Apr. 30, 1992 | [JP] | Japan | 4-138070 |
| Jul. 8, 1992 | [JP] | Japan | 4-204539 |
| Jan. 14, 1993 | [JP] | Japan | 5-21788 |
| Jan. 14, 1993 | [JP] | Japan | 5-21789 |

[51] Int. Cl.$^6$ ................................. B01J 8/02
[52] U.S. Cl. ................... 423/239.1; 423/213.2; 423/213.7; 502/347
[58] Field of Search ............ 423/213.2, 239.1, 423/213.7; 502/347

[56] References Cited

U.S. PATENT DOCUMENTS

| 2,992,238 | 7/1961 | Zimmerman | 502/348 |
| 3,758,418 | 9/1973 | Leonard et al. | 502/347 X |
| 3,867,508 | 2/1975 | Hass | 423/213.7 |
| 4,016,241 | 4/1977 | Nishikawa et al. | 423/239.1 |
| 4,303,552 | 12/1981 | Ernest et al. | 502/308 |

(List continued on next page.)

FOREIGN PATENT DOCUMENTS

| 0362960 | 4/1990 | European Pat. Off. . |
| 0455491 | 11/1991 | European Pat. Off. . |

(List continued on next page.)

OTHER PUBLICATIONS

Thesis 2A526, The 59th Spring Conference of the Japan Chemical Society, 1990. (no month).
Thesis 3L420, The 60th Fall Conference of the Japan Chemical Society, 1990. (no month).
Thesis 3L422, The 60th Fall Conference of the Japan Chemical Society, 1990. (no month).
Thesis 3L423, The 60th Fall Conference of the Japan Chemical Society, 1990. (no month).
"Selective Catalytic Reduction of Nitrogen Oxides with Hydrocarbons," *Catalysts*, vol. 33, No. 2, pp. 59–60, 1991. no month.

(List continued on next page.)

*Primary Examiner*—Wayne Langel
*Assistant Examiner*—Thomas G. Dunn, Jr.
*Attorney, Agent, or Firm*—Browdy and Neimark

[57] ABSTRACT

The method of cleaning an exhaust gas containing nitrogen oxides and oxygen in an amount larger than its stoichiometric amount relative to unburned components in the exhaust gas which includes (a) disposing an exhaust gas cleaner comprising a heat-resistant, porous inorganic oxide body made of alumina or composite oxide thereof and impregnated with Ag or its oxide, in a flow path of the exhaust gas; (b) introducing a reducing agent selected from the group consisting of gaseous hydrocarbons, liquid hydrocarbons and aliphatic oxygen-containing organic compounds into the exhaust gas on the upstream side of the exhaust gas cleaner; and (c) bringing the exhaust gas into contact with the exhaust gas cleaner at a temperature of 200°–600° C., thereby removing the nitrogen oxides.

5 Claims, 3 Drawing Sheets

U.S. PATENT DOCUMENTS

| | | | |
|---|---|---|---|
| 4,888,317 | 12/1989 | DeAngelis et al. | 502/60 |
| 4,912,077 | 3/1990 | Lachman et al. | 502/302 |
| 5,208,205 | 5/1993 | Subramanian et al. | 502/333 |
| 5,336,476 | 8/1994 | Kintaichi et al. | 423/239.1 |

FOREIGN PATENT DOCUMENTS

| | | |
|---|---|---|
| 0459396 | 12/1991 | European Pat. Off. . |
| 2654364 | 5/1991 | France . |
| 2411888 | 9/1974 | Germany . |
| 44-13002 | 6/1969 | Japan . |
| 49-110590 | 10/1974 | Japan . |
| 49-122474 | 11/1974 | Japan . |
| 52-7376 | 1/1977 | Japan . |
| 54-16389 | 2/1979 | Japan . |
| 54-79161 | 6/1979 | Japan . |
| 63-100919 | 5/1988 | Japan . |
| 63-283727 | 11/1988 | Japan . |
| 1-130735 | 5/1989 | Japan . |
| 2-144147 | 6/1990 | Japan . |
| 2-293047 | 12/1990 | Japan . |
| 4-20971 | 5/1992 | Japan . |
| 4-22013 | 5/1992 | Japan . |

OTHER PUBLICATIONS

"Selective Catalytic Reduction of Nitrogen Monoxide byHydrocarbons," *Catalyst,* vol. 33, No. 2, pp. 61–64, 1991. no month.

Hawley, The Condensed Chemical Dictionary, 1981, p. 740. no month.

METHOD OF CLEANING AN EXHAUST GAS AND EXHAUST GAS CLEANER THEREFOR

This is a continuing application of co-pending application Ser. No. 08/104,894, filed Aug. 12, 1993, which itself is a continuation-in-part of application Ser. No. 07/916,409, filed Jul. 21, 1992, now abandoned.

BACKGROUND OF THE INVENTION

The present invention relates to an exhaust gas cleaner for cleaning an exhaust gas containing nitrogen oxides and oxygen in an amount larger than its stoichiometric amount relative to unburned components such as carbon monoxide, hydrogen, hydrocarbons in the exhaust gas, and a method of cleaning such an exhaust gas.

Various exhaust gases discharged from internal combustion engines such as automobile engines, etc., combustion apparatuses installed in factories, home fun heaters, etc. contain nitrogen oxides such as nitrogen monoxide, nitrogen dioxide (hereinafter referred to simply as "NOx") and oxygen in an amount larger than its stoichiometric amount relative to unburned components. The NOx is one of causes of air pollution such as photochemical smog and acidic rain, posing a serious problem of environmental pollution in a global scale. For these reasons, it is desired to remove NOx from exhaust gases emitted from various combustion equipments.

In the case of an exhaust gas from gasoline engines, NOx is usually removed by using so-called three-component catalysts. Also, in the case of large, stationary combustion apparatuses such as boilers, etc., ammonia is introduced into an exhaust gas, whereby nitrogen oxides in the exhaust gas are catalytically and selectively reduced.

However, in the case of an exhaust gas having a relatively high oxygen concentration such as those discharged from diesel engines and those discharged from gasoline engines operable in a lean condition, efficient removal of NOx cannot be achieved with the above-described three-component catalysts suitable for usual gasoline engines. Also, the reduction of NOx with ammonia introduced into an exhaust gas cannot be applied to movable exhaust gas sources such as automobiles, because this reduction system needs large apparatuses and poisonous, expensive ammonia.

Therefore, it has been desired to develop a method of reducing NOx in the exhaust gas having a relatively high oxygen concentration which is discharged from diesel engines, etc., and various attempts have been made so far.

For instance, there have been proposed methods of reducing NOx in an exhaust gas with a hydrocarbon introduced into the exhaust gas. One example of such methods is disclosed by Japanese Patent Publication No. 44-13002, which comprises passing an exhaust gas through a honeycomb-type ceramic filter carrying a platinum-group metal catalyst while controlling the temperature and flow rate of the exhaust gas, and adding a gaseous reducing fuel (specifically, methane, etc.) to the exhaust gas.

However, this method fails to efficiently reduce NOx in the exhaust gas discharged from diesel engines, etc. According to research by the inventors, even though a hydrocarbon having a small carbon number which is in a gas state in a normal condition, such as methane, propane, etc. is added as an NOx-reducing agent to the exhaust gas discharged from diesel engines, a large removal ratio of NOx cannot be obtained.

There has also been proposed a method of cleaning an exhaust gas, which comprises mixing an exhaust gas containing oxygen and NOx with a hydrocarbon to cause a reaction between oxygen and a hydrocarbon such that the hydrocarbon is partially oxidized to a reducing hydrogen gas and carbon monoxide and to lower the oxygen concentration, the resulting hydrogen gas and carbon monoxide being reacted with NOx in the exhaust gas, thereby decomposing them to nitrogen, carbon dioxide and water (Japanese Patent Laid-Open No. 49-122474). However, since the reduction reaction of NOx should be conducted at a relatively high temperature in this method, it is not suitable for cleaning the exhaust gas of automobiles.

There is an alternative method for reducing NOx which comprises adding a petroleum fuel as a reducing agent to a combustion exhaust gas in a high-temperature region alone or together with part of the combustion exhaust gas with or without air, and adding an air to the combustion exhaust gas in the downstream to reduce NOx in the combustion exhaust gas, the addition of the petroleum fuel such as methane, propane, gasoline, kerosine, naphtha, heavy oil, etc. being conducted by a plurality of steps such that a ratio of the amount of oxygen remaining in the exhaust gas to the amount of oxygen necessary for completely burning the petroleum fuel added is within a particular range (Japanese Patent Laid-Open No. 54-79161).

However, this method cannot remove NOx efficiently without keeping a region where a reducing agent and NOx are reacted at 1000° C. or higher. Thus, this method is also not suitable for cleaning the exhaust gas of automobiles.

There has also been proposed a method of cleaning an exhaust gas, which comprises contacting an exhaust gas containing oxygen and NOx with a gaseous reducing agent such as hydrogen, and carbon monoxide. However, since a catalyst is not used in this method, a large amount of the reducing agent should be added. Accordingly, this non-catalytic method is effective only for the exhaust gas having a relatively low oxygen concentration, which is generated by burning nearly at a stoichiometric air-fuel ratio.

There have been proposed methods of reducing NOx by adding to an exhaust gas a reducing agent in a smaller amount than a stoichiometric amount relative to oxygen in the exhaust gas, in the presence of a catalyst such as zeolite carrying a transition metal (Japanese Patent Laid-Open Nos. 63-100919, 63-283727, and 1-130735, Thesis 2A526, 1990, the 59th Spring Conference of the Japan Chemical Society, Theses 3L420, 3L422 and 3L423, 1990, the 60th Fall Conference of the Japan Chemical Society).

However, the catalysts used in these methods are poor in efficiency when moisture is contained in the exhaust gas, and an actual exhaust gas contains about 10% of moisture. Accordingly, the methods using such catalysts fail to achieve a high reduction ratio of NOx in the actual exhaust gas. In addition, the optimum temperature of the reduction reaction of NOx is as high as nearly 600° C. in these methods.

There has also been proposed a method of cleaning an exhaust gas, which comprises introducing methanol into the exhaust gas and bringing the exhaust gas containing methanol into contact with alumina at about 300° C. ("Catalyst", Vol. 33, No. 2, 59 (1991)). However, this method is poor in efficiency of removing nitrogen oxides.

OBJECT AND SUMMARY OF THE INVENTION

Accordingly, an object of the present invention is to provide an method capable of efficiently removing NOx from an exhaust gas containing nitrogen oxides and oxygen in an amount larger than the stoichiometric amount relative to unburned components such as carbon monoxide, hydrogen, hydrocarbons, etc., which is discharged from diesel engines, gasoline engines operated under oxygen excess conditions, and stationary combustion apparatuses.

Another object of the present invention is to provide an exhaust gas cleaner capable of reducing nitrogen oxides in the exhaust gas efficiently at a relatively low temperature.

As a result of intense research in view of the above objects, the inventors have found that in the exhaust gas containing nitrogen oxides and oxygen in an amount larger than its stoichiometric amount relative to unburned components such as carbon monoxide, hydrogen, hydrocarbons, nitrogen oxides are effectively reduced, even when the exhaust gas contains about 10% of moisture, in the presence of an exhaust gas cleaner comprising a heat-resistant, porous inorganic oxide body made of alumina or a composite oxide thereof and impregnated with catalytically active component consisting essentially of Ag or its oxide, by adding reducing agents such as hydrocarbons, aliphatic alcohols, and other aliphatic oxygen-containing organic compounds to the exhaust gas to cause a reaction between the reducing agents and nitrogen oxides. Also, the inventors have found that by treating the exhaust gas cleaner with $SO_2$ in advance, further increase of removal ratio of NOx can be obtained.

Thus, the first exhaust gas cleaner according to the present invention comprises a heat-resistant, porous inorganic oxide body made of alumina or a composite oxide thereof and impregnated with catalytically active component consisting essentially of Ag or its oxide.

The first method of cleaning an exhaust gas containing nitrogen oxides and oxygen in an amount larger than its stoichiometric amount relative to unburned components in the exhaust gas according to the present invention comprises (a) disposing an exhaust gas cleaner comprising a heat-resistant, porous inorganic oxide body made of alumina or a composite oxide thereof and impregnated with catalytically active component consisting essentially of Ag or its oxide, in a flow path of the exhaust gas; (b) introducing a reducing agent selected from the group consisting of gaseous hydrocarbons, liquid hydrocarbons and aliphatic oxygen-containing organic compounds into a stream of the exhaust gas on the upstream side of the exhaust gas cleaner; and (c) bringing the exhaust gas into contact with the exhaust gas cleaner at a temperature of 200°–600° C., thereby removing the nitrogen oxides.

The second method of cleaning an exhaust gas containing nitrogen oxides and oxygen in an amount larger than its stoichiometric amount relative to unburned components in the exhaust gas according to the present invention comprises (a) disposing an exhaust gas cleaner comprising a heat-resistant, porous inorganic oxide layer made of alumina or a composite oxide thereof and formed on a heat-resistant substrate, and Ag or its oxide impregnated into the porous inorganic oxide layer, in a flow path of the exhaust gas, the Ag or its oxide being in an amount of 0.1–15 weight % (on a silver metal basis) based on the porous inorganic oxide layer; (b) introducing a reducing agent selected from the group consisting of gaseous hydrocarbons, liquid hydrocarbons and aliphatic oxygen-containing organic compounds into a stream of the exhaust gas on the upstream side of the exhaust gas cleaner; and (c) bringing the exhaust gas containing the reducing agent into contact with the exhaust gas cleaner at a temperature of 200°–600° C., thereby removing the nitrogen oxides.

The third method of cleaning an exhaust gas containing nitrogen oxides and oxygen in an amount larger than its stoichiometric amount relative to unburned components in the exhaust gas according to the present invention comprises (a) disposing an exhaust gas cleaner comprising a porous inorganic oxide body made of alumina or a composite oxide thereof and impregnated with catalytically active component consisting essentially of Ag or its oxide, in a flow path of the exhaust gas, the Ag or its oxide being in an amount of 0.1–15 weight % (on a silver metal basis) based on the porous inorganic oxide body; (b) introducing a gaseous hydrocarbon at a weight ratio of 0.2–4 to the nitrogen oxides into the exhaust gas on the upstream side of the exhaust gas cleaner; and (c) bringing the exhaust gas containing the gaseous hydrocarbon into contact with the exhaust gas cleaner at a temperature of 200°–600° C., to cause a reaction between the nitrogen oxides and the gaseous hydrocarbon, thereby removing the nitrogen oxides.

The fourth method of cleaning an exhaust gas containing nitrogen oxides and oxygen in an amount larger than its stoichiometric amount relative to unburned components in the exhaust gas according to the present invention comprises (a) disposing an exhaust gas cleaner comprising a heat-resistant, porous inorganic oxide body made of alumina or a composite oxide thereof and impregnated with catalytically active component consisting essentially of Ag or its oxide, in a flow path of the exhaust gas, the amount of the Ag or its oxide being 0.1–15 weight % (on a silver metal basis) based on the porous inorganic oxide body; (b) introducing a liquid hydrocarbon at a weight ratio of 0.2–5 to the nitrogen oxides into a stream of the exhaust gas on the upstream side of the exhaust gas cleaner; and (c) bringing the exhaust gas into contact with the exhaust gas cleaner at a temperature of 300°–550° C., to cause a reaction between the nitrogen oxides and the liquid hydrocarbon, thereby removing the nitrogen oxides.

The fifth method of cleaning an exhaust gas containing nitrogen oxides and oxygen in an amount larger than its stoichiometric amount relative to unburned components in the exhaust gas according to the present invention comprises (a) disposing an exhaust gas cleaner comprising a heat-resistant, porous inorganic oxide body made of alumina or a composite oxide thereof and impregnated with catalytically active component consisting essentially of Ag or its oxide, in a flow path of the exhaust gas; (b) introducing an aliphatic oxygen-containing organic compound having 2 or more carbon atoms and 1 or more oxygen atoms at a weight ratio of 0.2–4 to the nitrogen oxides into a stream of the exhaust gas on the upstream side of the exhaust gas cleaner; and (c) bringing the exhaust gas into contact with the exhaust gas cleaner at a temperature of 200°–600° C., to cause a reaction between the nitrogen oxides and the aliphatic oxygen-containing organic compound, thereby removing the nitrogen oxides.

The second exhaust gas cleaner according to the present invention comprises a heat-resistant, porous inorganic oxide body made of alumina or a composite oxide thereof and impregnated with catalytically active component consisting essentially of Ag or its oxide, the exhaust gas cleaner being subjected to a treatment with $SO_2$.

The sixth method of cleaning an exhaust gas containing nitrogen oxides and oxygen in an amount larger than its stoichiometric amount relative to unburned components in the exhaust gas according to the present invention comprises (a) disposing an exhaust gas cleaner comprising a heat-resistant, porous inorganic oxide body made of alumina or a composite oxide thereof and impregnated with catalytically active component consisting essentially of Ag or its oxide, the exhaust gas cleaner being subjected to a treatment with $SO_2$, in a flow path of the exhaust gas; (b) introducing a reducing agent selected from the group consisting of hydrocarbons having 2 or more carbon atoms and aliphatic oxygen-containing organic compounds into a stream of the exhaust gas on the upstream side of the exhaust gas cleaner; and (c) bringing the exhaust gas containing the reducing agent into contact with the exhaust gas cleaner at a temperature of 200°–600° C., to cause a reaction between the nitrogen oxides and the reducing agent, thereby removing the nitrogen oxides.

DETAILED DESCRIPTION OF THE INVENTION

The present invention will be explained in detail below.

[1] Exhaust Gas-Cleaning Apparatus

[A] Overall System

Figure 1:
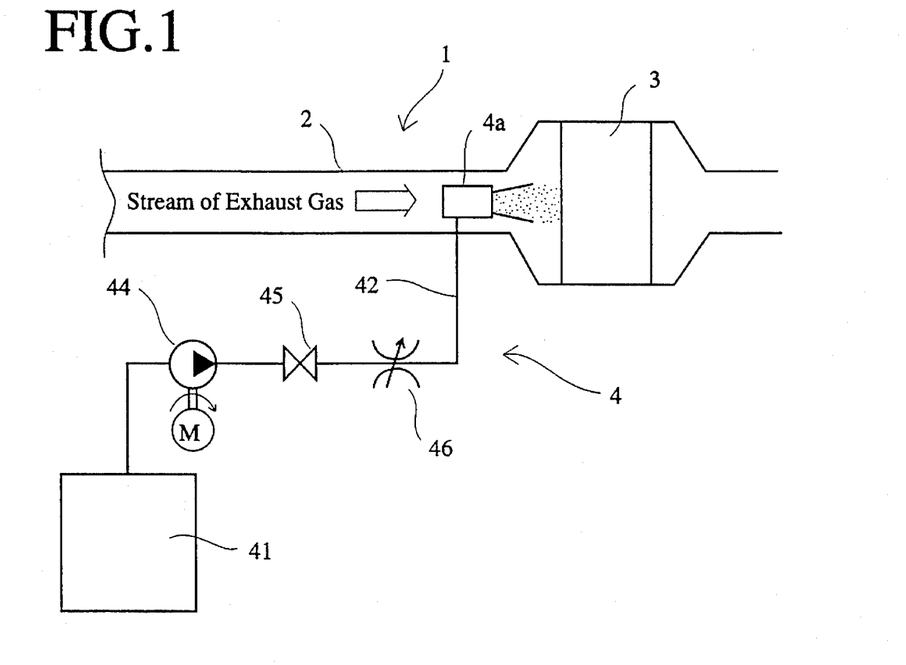
FIG. 1 is a schematic view showing an exhaust gas-cleaning apparatus for cleaning an exhaust gas according to the present invention.

Referring to FIG. 1, the exhaust gas-cleaning apparatus 1 which uses a liquid hydrocarbon as a reducing agent comprises a pipe 2 through which an exhaust gas passes, an exhaust gas cleaner 3 comprising a heat-resistant, porous inorganic oxide body disposed in the pipe 2, and a reducing agent supply system 4 comprising a spray means 4a disposed in the pipe 2 on the upstream side of the exhaust gas cleaner 3 for spraying a reducing agent into a stream of the exhaust gas.

The reducing agent supply system 4 comprises a reducing agent-storing tank 41, and a reducing agent supply pipe 42 communicating with a spray nozzle 4a for introducing the reducing agent into the exhaust gas. Disposed in the reducing agent supply pipe 42 are a pump 44 for supplying the reducing agent to the spray nozzle 4a, a throttle valve 45 for controlling the flow rate of the reducing agent, and a switch valve 46 for opening or shutting the pipe 42. Instead of the pump 44, a pressure means (not shown) may be mounted to the tank 41 so that the reducing agent can be ejected at a proper pressure. The spray nozzle 4a comprises only one thin flow path (not shown) through which the reducing agent passes, and the amount of the reducing agent supplied to the spray nozzle 4a is controlled by the throttle valve 45 and the switch valve 46.

If the air is to be introduced into the exhaust gas together with the reducing agent, an air pipe (not shown) for supplying a proper amount of a compressed air may be connected to the spray nozzle 4a.

Although this apparatus is adapted to be used for a reducing agent which is in a liquid state in a standard state (1 atm and room temperature), it may be modified by omitting the pump 44 such that it is used for a gaseous reducing agent.

[B] Exhaust Gas Cleaner (a) Heat-Resistant, Porous Inorganic Oxide Body

The exhaust gas cleaner 3 disposed in the exhaust gas-cleaning apparatus 1 comprises a porous inorganic oxide body serving as sites of reaction between a reducing agent and nitrogen oxides in the exhaust gas. Since the heat-resistant, porous inorganic oxide body is exposed to a high-temperature exhaust gas, it is required to have an excellent heat resistance, and particularly an excellent thermal shock resistance. Such a porous inorganic oxide body may preferably be constituted by porous pellets or granules packed in a casing, or in the form of a solid body such as a honeycomb, a foam or a plate, or in a composite form composed of a heat-resistant substrate and a porous inorganic oxide layer formed on the substrate.

(i) Porous Inorganic Oxide Pellets, etc.

Materials for the porous inorganic oxide pellets, etc. are alumina and its composites. Particularly preferable materials for the porous inorganic oxide pellets, etc. are γ-alumina or its composite oxide such as titania-alumina, silica-alumina, zirconia-alumina, etc. With catalytically active γ-alumina, the added reducing agent and the nitrogen oxides in the exhaust gas are reacted efficiently.

Since NOx in the exhaust gas is reacted with a reducing agent while the exhaust gas is passing through the exhaust gas cleaner, it is preferable that the pressure drop of the exhaust gas in the exhaust gas cleaner is within a permissible range, and that the porous inorganic oxide body has a large surface area which is brought into contact with the exhaust gas. In the above respects, it is preferable that a specific surface area of the porous inorganic oxide body is preferably about 30 $m^2/g$ or more. When the specific surface area is smaller than about 30 $m^2/g$, a sufficient reaction between the nitrogen oxides in the exhaust gas and the reducing agent added cannot take place in the exhaust gas cleaner.

(ii) Porous Inorganic Oxide Layer

Materials for the porous inorganic oxide layers are alumina and its composites. Particularly preferable materials are γ-alumina or its composite oxide such as titania-alumina, silica-alumina, zirconia-alumina, etc. With catalytically active γ-alumina, the added reducing agent and the nitrogen oxides in the exhaust gas are reacted efficiently. Incidentally, a specific surface area of the porous inorganic oxide body is preferably about 30 $m^2/g$ or more.

A heat-resistant substrate for supporting the porous inorganic oxide layer may be made of ceramics such as alumina, silica, titania, zirconia and their composites such as silica-alumina, alumina-zirconia, alumina-titania, silica-titania, silica-zirconia, titania-zirconia, mullite, cordierite, etc. The heat-resistant substrate may be in the form of a honeycomb filter, a foam filter, a fiber assembly filter, pellets, etc.

The porous inorganic oxide layer formed on the heat-resistant substrate has preferably a surface specific area of about 30 $m^2/g$ or more.

The porous inorganic oxide layer may be formed on the heat-resistant substrate by a known wash-coating method, a known sol-gel method, etc.

In the wash-coating method, the heat-resistant substrate is immersed in a slurry of the above ceramic powder and dried so that a porous inorganic oxide layer is formed on the heat-resistant substrate. To cause the porous inorganic oxide layer to support Ag or its oxide, there are two methods available: (1) a method of applying Ag or its oxide by impregnation or precipitation to the carrier layer (porous inorganic oxide layer) wash-coated on the heat-resistant substrate, and (2) a method of forming an Ag or its oxide-supporting porous inorganic oxide layer on the heat-resistant substrate by wash-coating the heat-resistant substrate with a suspension of Ag or its oxide-containing ceramic powder. According to the latter method (2), the porous inorganic oxide layer supporting Ag or its oxide can be formed by a single step.

In the sol-gel method, either one of the following two procedures can be conducted.

The first sol-gel method comprises hydrolyzing organic salts (for instance, alkoxides) of the porous inorganic oxide layer-constituting metals; applying the resulting sol to the heat-resistant substrate; bringing the coated heat-resistant substrate into contact with water vapor, etc. to form a layer composed of colloidal particles; drying and burning it to convert it to a carrier layer for Ag or its oxide; and applying Ag or its oxide to the carrier layer. For instance, when Ag or its oxide is to be supported by an alumina ($Al_2O_3$) carrier layer, a solution of Al alkoxide (for instance, $Al(o\text{-}isoC_3H_7)_3$) in alcohol is mixed with an acid such as $CH_3COOH$, $HNO_3$, HCl, etc. to prepare a coating solution, and the heat-resistant substrate is immersed in the coating solution. After removing the heat-resistant substrate from the coating solution, it is reacted with vapor or water to cause gelation. After drying and burning, a thin alumina coating is formed on a porous surface of the heat-resistant substrate. Next, the coated heat-resistant substrate is impregnated with aqueous solutions of carbonates, nitrates, acetates, hydroxides, etc. of Ag; and the impregnated layer is dried and burned on the heat-resistant substrate.

In the second sol-gel method, the ceramic carrier materials and Ag or its oxide are simultaneously applied to the heat-resistant substrate. For instance, a solution of Al alkoxide in alcohol is mixed with an acid such as $CH_3COOH$, $HNO_3$, HCl, etc. and an aqueous solution of a silver salt to prepare a coating solution, and the heat-resistant substrate is immersed in the coating solution. After removing the heat-resistant substrate from the coating solution, it is treated with vapor or liquid water to prepare a sol, which is then converted to a gel. The gel is dried and then burned to provide a ceramic carrier layer impregnated with Ag or its oxide.

By using the sol-gel method, the Ag or its oxide can be extremely uniformly dispersed in the heat-resistant substrate, leading to an increase in catalytic activity.

In the sol-gel method, the acid serves as a hydrolysis catalyst in the course of gelation. However, alkali metals may be added in place of the acids to conduct the hydrolysis reaction.

(b) Ag or Its Oxide

In the present invention, Ag or its oxide is impregnated into the porous inorganic oxide body made of alumina or a composite oxide thereof, and the amount of Ag or its oxide is generally 0.1–15 weight % (on a silver metal basis) based on the porous inorganic oxide body. When the amount of Ag or its oxide is less than 0.1 weight %, sufficient effect of Ag or its oxide cannot be obtained. On the other hand, even when the amount of Ag or its oxide exceeds 15 weight %, further advantage of increasing the efficiency of reducing nitrogen oxides cannot be achieved.

When acetylene is added, the amount of Ag or its oxide is preferably 0.1–10 weight %, and more preferably 0.1–5 weight %. When the liquid or gaseous hydrocarbons or the aliphatic oxygen-containing organic compounds are added, the amount of Ag or its oxide is 0.1–15 weight %, and preferably 0.5–10 weight %. Per Examples 26–28 below, the amount of Ag or its oxide (on a silver metal basis) can be more than 5 wt % and up to 15 wt % based on the porous inorganic oxide body.

With respect to the production of the exhaust gas cleaner, the porous inorganic oxide body is first immersed in an aqueous solution of a silver salt such as silver nitrate, and then dried and burned. The substrate which has porous inorganic oxide layer impregnated with Ag or its oxide may also be produced under the same conditions.

The porous inorganic oxide body is preferably dried and then heated in a non-oxidizing atmosphere such as vacuum, a nitrogen atmosphere, or a hydrogen atmosphere. The drying of the porous inorganic oxide body is preferably conducted at about 70° C. or higher. With respect to the heating conditions, when the heating is conducted in the above atmosphere, the resulting exhaust gas cleaners are catalytically more active than those heated in the air. Also, the heating of the exhaust gas cleaner is preferably conducted at a temperature increasing stepwise from about 100° C. to about 600° C. in the above non-oxidizing atmosphere, and then at about 550° C. or higher in an oxygen-containing atmosphere.

Incidentally, the term "Ag or its oxide" is used herein to express a silver component carried by the porous inorganic oxide body produced by the above method.

(c) Treatment of Exhaust Gas Cleaner with $SO_2$

The exhaust gas cleaner carrying Ag or its oxide is preferably treated with a $SO_2$-containing gas. In general, 1 g of the exhaust gas cleaner carrying Ag or its oxide is brought into contact with 0.02–1 mmol of $SO_2$. When the amount of $SO_2$ is smaller than 0.02 mmol, sufficient effect of treatment cannot be achieved. On the other hand, even when the amount of $SO_2$ exceeds 1 mmol, further improvement of the catalytic activity cannot be obtained. With the exhaust gas cleaner treated with $SO_2$, hydrocarbons and aliphatic oxygen-containing organic compounds added are not directly oxidized by oxygen in the exhaust gas. Accordingly, sufficient reaction between the nitrogen oxides and the hydrocarbons and aliphatic oxygen-containing organic compounds can proceed at lower temperatures.

[2] Method of Cleaning Exhaust Gas

[A] Reducing Agents

The exhaust gas discharged from diesel engines, etc. contains small amounts of hydrocarbons such as acetylene, ethylene, propylene, etc. which can act as reducing agents for reducing the nitrogen oxides in the exhaust gas. In general, the proportion of the unburned unsaturated hydrocarbon remaining in the exhaust gas is about 40 ppm, and it can be increased to some extent by adjusting engine conditions, etc. However, when hydrocarbons do not remain in the exhaust gas in sufficient amount to reduce nitrogen oxides in the exhaust gas, reducing agents such as hydrocarbons, alcohols, etc. are added to the exhaust gas on the upstream side of the exhaust gas cleaner in a flow path of the exhaust gas.

The reducing agents added to the exhaust gas are gaseous or liquid hydrocarbons, or aliphatic oxygen-containing organic compounds such as aliphatic alcohols.

(a) Hydrocarbons

The hydrocarbons added to the exhaust gas may be in the form of a liquid or a gas.

(i) Liquid Hydrocarbons

The liquid hydrocarbon used in the present invention, which is in a liquid state under a normal condition. (room temperature and 1 atm), includes diesel oil, cetane, heptane, kerosine, etc. Its boiling point is room temperature—about 350° C. Preferred examples of such hydrocarbons are diesel oil, cetane, heptane, etc. When a hydrocarbon having a boiling point exceeding about 450° C. is added, it is not easily evaporated at an exhaust gas temperature under a normal operation condition, failing to accelerate the reduction of NOx. For safe operation, the upper limit of the boiling temperature of the hydrocarbon is set at about 350° C. Preferably, a hydrocarbon having a boiling point of about 90° C.–350° C., particularly 160°–340° C. is used. Such a hydrocarbon is typically diesel oil for a practical reason.

The amount of the liquid hydrocarbon added is properly determined depending on the amount of NOx in the exhaust gas. Specifically, a weight ratio of the liquid hydrocarbon to NOx in the exhaust gas is 0.2–5. When the weight ratio of the liquid hydrocarbon to NOx is less than 0.2, sufficient effect of adding the liquid hydrocarbon cannot be obtained. The upper limit of the weight ratio of the liquid hydrocarbon to NOx is determined from the economical point of view. The preferred weight ratio of the liquid hydrocarbon to NOx is 0.2–3.

(ii) Gaseous Hydrocarbons

The gaseous hydrocarbons (alkanes, alkenes or alkynes) used in the present invention are in a gaseous state in a standard state (room temperature and 1 atm). The preferred alkanes are propane, butane, etc., the preferred alkenes are ethylene, propylene, butylene, etc., and the preferred alkynes are acetylene, etc.

The weight ratio of the gaseous hydrocarbon to the amount of the nitrogen oxides in the exhaust gas is 0.2–4. When the ratio is less than 0.2, high efficiency of removing the nitrogen oxides cannot be achieved. The upper limit of the weight ratio of the hydrocarbon to NOx is determined from the economical point of view. Incidentally, since a small amount of hydrocarbon is already contained in the exhaust gas, the above weight ratio of the gaseous hydrocarbon is determined such that after the addition of the gaseous hydrocarbon, the weight ratio of the gaseous hydrocarbon in the exhaust gas is 0.2–4. Accordingly, if the exhaust gas contains a gaseous hydrocarbon at a sufficient level (more than 20 volume %), the addition of the gaseous hydrocarbon is not necessary. The preferred weight ratio of the gaseous hydrocarbon to the nitrogen oxides in the exhaust gas is 0.2–3.

(b) Aliphatic Oxygen-Containing Organic Compounds

The aliphatic oxygen-containing organic compound used in the present invention has 2 or more carbon atoms and 1 or more oxygen atoms. Specific examples of such aliphatic oxygen-containing organic compound include alcohols, ketones, aldehydes, carboxylic acids, ethers, esters, etc. With respect to the upper limit of the carbon number in the aliphatic oxygen-containing organic compound, it is preferably determined such that the boiling point of the aliphatic oxygen-containing organic compound does not exceed 400° C.

(i) Alcohols

As alcohols, monovalent aliphatic alcohols having low molecular weights such as ethanol, propanol (n-propyl alcohol, isopropyl alcohol), etc. are preferable. However, methanol is not effective to react with nitrogen oxides. Accordingly, the carbon number of the aliphatic alcohol is restricted to 2 or more.

(ii) Ketones

As ketones, acetone may be used.

(iii) Carboxylic Acids

As carboxylic acids, acetic acid is particularly preferable.

(iv) Aldehydes

As aldehydes, acetaldehyde is particularly preferable.

The weight ratio of the aliphatic oxygen-containing organic compound to the nitrogen oxides in the exhaust gas is 0.2–4. When the ratio is less than 0.2, high efficiency of removing the nitrogen oxides cannot be achieved. The upper limit of the weight ratio of the aliphatic oxygen-containing organic compounds to NOx is determined from economical point of view. The preferred weight ratio of the aliphatic oxygen-containing organic compound to the nitrogen oxides in the exhaust gas is 1–3.

[B] Temperature of Exhaust Gas

The exhaust gas passes through the exhaust gas cleaner at a temperature of 200°–600° C., so that the nitrogen oxides in the exhaust gas and the reducing agent can react with each other at a high efficiency.

(a) In a case where a gaseous hydrocarbon (alkane, alkene or alkyne) is added, the preferable temperature of the exhaust gas is 200°–600° C. When the temperature of the exhaust gas is lower than 200° C., a sufficient reaction between the nitrogen oxides and gaseous hydrocarbon cannot proceed. On the other hand, when the temperature of the exhaust gas is higher than 600° C., the gaseous hydrocarbon itself is burned, failing to reduce the nitrogen oxides effectively. The more preferred temperature of the exhaust gas is 250°–600° C.

Particularly, in the case of acetylene, the preferable temperature of the exhaust gas is 250°–550° C. When the temperature of the exhaust gas is lower than 250° C., a sufficient reaction between the nitrogen oxides and acetylene cannot proceed. On the other hand, when the temperature of the exhaust gas is higher than 550° C., acetylene itself is burned, failing to reduce the nitrogen oxides effectively. The more preferred temperature of the exhaust gas is 300°–550° C.

(b) In a case where the liquid hydrocarbon is added, the preferable temperature of the exhaust gas is 300°–550° C. When the temperature of the exhaust gas is lower than 300° C., a sufficient reaction between the nitrogen oxides and the liquid hydrocarbon cannot proceed. On the other hand, when the temperature of the exhaust gas is higher than 550° C., the liquid hydrocarbon itself is burned, failing to reduce the nitrogen oxides effectively. The more preferred temperature of the exhaust gas is 350°–500° C.

(c) In a case where the aliphatic oxygen-containing organic compound is added, the preferable temperature of the exhaust gas is 200°–600° C. When the temperature of the exhaust gas is lower than 200° C., a sufficient reaction between the nitrogen oxides and the aliphatic oxygen-containing organic compound cannot proceed. On the other hand, when the temperature of the exhaust gas is higher than 600° C., the aliphatic oxygen-containing organic compound itself is burned, failing to reduce the nitrogen oxides effectively.

Particularly, in the cases of alcohols and ketones, the temperature of the exhaust gas is preferably 200°–550° C., more preferably 250°–500° C. In the case of carboxylic acids, the temperature of the exhaust gas is preferably 300°–600° C., and more preferably 350°–550° C.

Incidentally, since the measurement of the temperature of the exhaust gas in the exhaust gas cleaner is often very difficult, the temperature of the exhaust gas in the exhaust gas pipe 2 slightly upstream of the exhaust gas cleaner 3 may be measured and used as a substitute for the temperature of the exhaust gas in the exhaust gas cleaner 3.

In an actual engine operation, the temperature of an exhaust gas discharged from the engine may change from time to time depending on driving conditions. Accordingly, to ensure high-efficiency in cleaning of the exhaust gas, the temperature of the exhaust gas is preferably adjusted within the above range. One example of such a control is shown below. First, a valve for controlling the flow rate of the exhaust gas and a means for sensing the temperature of the exhaust gas are mounted in the exhaust gas pipe 2 at positions upstream of the exhaust gas cleaner, and the flow rate control valve is throttled whenever the temperature of the exhaust gas becomes lower than the lower limit of the above range, to increase the temperature of the exhaust gas. Oppositely, in the case of lowering the temperature of the exhaust gas, the flow rate control valve is opened.

[C] Contact Time

How long it takes for the exhaust gas to pass through the exhaust gas cleaner is expressed by a product of a time period during which a unit amount of the exhaust gas is in contact with the exhaust gas cleaner and the amount of the exhaust gas cleaner. This product is defined as "contact time." The unit of the contact time is sec·g/ml, wherein "g" is a weight of the exhaust gas cleaner, and "ml" is a volume of the exhaust gas (converted to a volume under a normal condition of 1 atm and 0° C.). For instance, when 1 ml (converted to a volume in a standard state) of an exhaust gas is brought into contact with 1 g of the catalyst (exhaust gas cleaner) for 0.03 seconds, the contact time is 0.03 sec·g/ml.

In the present invention, the contact time is 0.01 sec·g/ml or more. When the contact time is less than 0.01 sec·g/ml, a sufficient reaction does not take place between the nitrogen oxides and the reducing agent, resulting in a low removal ratio of nitrogen oxides. Also, the unreacted reducing agent remains in the exhaust gas which is to be discharged.

On the other hand, when the contact time is too large, NOx-removing efficiency is low. Accordingly, the upper limit of the contact time is preferably 0.3 sec·g/ml.

Incidentally, in the above explanations, the term "Ag or its oxide" means that Ag may exist in the form of a metal or an oxide.

The present invention will be described in further detail by way of the following Examples. In each Example and Comparative Example, the Ag or its oxide is described by Ag alone for simplicity, and the amount of Ag is expressed on a metal basis.

Example 1, Comparative Example 1

10 g of commercially available pellets made of γ-alumina (diameter: 1.5 mm, length: about 6 mm, specific surface area: 200 m$^2$/g) were immersed in an aqueous solution of $AgNO_3$ (concentration: 0.02 g/ml), dried at 70° C. and heated at 150° C., 200° C., 300° C., 400° C. and 500° C. each for 2 hours in a nitrogen stream containing 5 volume % of hydrogen and finally at 500° C. for 2 hours in a nitrogen stream containing 10 volume % of oxygen, to obtain an exhaust gas cleaner in which 1 weight % (on a silver metal basis) of Ag was supported by the pellets. The resulting exhaust gas cleaner was charged into a reactor, and a test gas having a composition shown in Table 1 below was caused to pass through the reactor at a rate of 2 liters per minute (in a standard state).

TABLE 1

| Component | Concentration |
| --- | --- |
| Nitrogen monoxide | 500 ppm |
| Carbon dioxide | 10 volume % |
| Oxygen | 10 volume % |
| Acetylene | 500 ppm |
| Nitrogen | Balance |
| Water | 10 volume % based on the total (100 volume %) of the above components. |

The contact time of the test gas was 0.3 sec·g/ml, and the temperature of the test gas was 250°–550° C. in the reactor to cause a reaction between the nitrogen monoxide in the test gas with acetylene.

By passing through the reactor, nitrogen monoxide was converted to nitrogen and nitrogen dioxide. Accordingly, the concentration of NOx (sum of nitrogen monoxide and nitrogen dioxide) in the test gas after passing through the exhaust gas cleaner was measured by a chemiluminescence analyzer to determine the removal ratio of NOx. The results are shown in Table 2.

For comparison, Example 1 was repeated except for keeping the temperature of the exhaust gas in the exhaust gas cleaner in the reactor at 600° C., and the same measurement as in Example 1 was conducted. The results are shown in Table 2.

Example 2

The same γ-alumina pellets as in Example 1 were immersed in an aqueous solution of $AgNO_3$ (concentration: 0.02 g/ml), dried at 70° C. and heated at 100° C., 200° C., 300° C., and 400° C. each for 2 hours in the air, to obtain an exhaust gas cleaner in which 1 weight % (on a silver metal basis) of Ag was supported by the pellets. With the above exhaust gas cleaner, the same measurement of the removal ratio of NOx as in Example 1 was conducted. The results are shown in Table 2.

TABLE 2

| | | Removal Ratio (%)[1] of NOx at | | | | | | | |
| --- | --- | --- | --- | --- | --- | --- | --- | --- | --- |
| No. | Additive | 250° C. | 300° C. | 350° C. | 400° C. | 450° C. | 500° C. | 550° C. | 600° C. |
| Ex. 1 | Acetylene | 23 | 34 | 47 | 52 | 43 | 35 | 30 | — |
| Ex. 2 | Acetylene | 11 | 15 | 29 | 40 | 39 | 32 | 17 | — |
| Com. Ex. 1 | Acetylene | — | — | — | — | — | — | — | 10 |

TABLE 2-continued

| | | Removal Ratio (%)[1] of NOx at | | | | | | | |
|---|---|---|---|---|---|---|---|---|---|
| No. | Additive | 250° C. | 300° C. | 350° C. | 400° C. | 450° C. | 500° C. | 550° C. | 600° C. |

Note: [1]Calculated from the amount (A) of NO in the test gas before entering the exhaust gas cleaner and the total amount (B) of NO and $NO_2$ in the exhaust gas which passed through the exhaust gas cleaner, by the formula: $(A - B)/A \times 100\%$.

Comparative Example 2

Example 1 was repeated except for using the exhaust gas cleaner without Ag or its oxide and varying the temperature of the test gas from 300° C. to 550° C., and the removal ratio of NOx was measured under the same conditions as in Example 1. The results are shown in Table 3.

TABLE 3

| | | Removal Ratio (%) of NOx at | | | | | |
|---|---|---|---|---|---|---|---|
| No. | Additive | 300° C. | 350° C. | 400° C. | 450° C. | 500° C. | 550° C. |
| Com. Ex. 2 | Acetylene | 2 | 8 | 32 | 45 | 45 | 33 |

Examples 3–5

With ethylene, propylene and propane in place of acetylene, Example 1 was repeated at a temperature of the exhaust gas in the exhaust gas cleaner in the reactor from 400° C. to 600° C., and the same measurement as in Example 1 was conducted. The results are shown in Table 4.

TABLE 4

| | | Removal Ratio (%) of NOx at | | | | |
|---|---|---|---|---|---|---|
| No. | Additive | 400° C. | 450° C. | 500° C. | 550° C. | 600° C. |
| Ex. 3 | Ethylene | 2 | 5 | 10 | 18 | — |
| Ex. 4 | Propylene | 13 | 21 | 29 | 30 | 8 |
| Ex. 5 | Propane | 4 | 10 | 23 | 32 | 24 |

Example 6

12 g of commercially available pellets made of γ-alumina (diameter: 1.5 mm, length: about 6 mm, specific surface area: 200 m²/g) were immersed in an aqueous solution of $AgNO_3$ (concentration: 0.02 g/ml), dried at 70° C. and heated at 150° C., 200° C., 300° C., 400° C. and 500° C. each for 2 hours in a nitrogen stream containing 5 volume % of hydrogen and finally at 500° C. for 2 hours in a nitrogen stream containing 10 volume % of oxygen, to obtain an exhaust gas cleaner in which 1 weight % (on a silver metal basis) of Ag was supported by the pellets.

The resulting exhaust gas cleaner was charged into a reactor, and a test gas having a composition shown in Table 5 below was caused to pass through the reactor at a rate of 2 liters per minute (in a normal state). Diesel oil was introduced into a stream of the exhaust gas on the upstream side of the exhaust gas cleaner in such an amount that a weight ratio of diesel oil to the nitrogen oxides in the exhaust gas was 2. With the temperature of the exhaust gas in the exhaust gas cleaner varying from 350° C. to 550° C., the gasified diesel oil was caused to react with the nitrogen oxides in the exhaust gas.

TABLE 5

| Component | Concentration |
|---|---|
| Nitrogen monoxide | 1500 ppm |
| Oxygen | 10 volume % |

TABLE 5-continued

| Component | Concentration |
|---|---|
| Moisture | 10 volume % |
| Nitrogen | Balance |
| Diesel Oil | Two times the weight of NO |

The concentration of NOx (sum of nitrogen monoxide and nitrogen dioxide) in the test gas which passed through the reactor was measured by a chemiluminescence analyzer to determine the removal ratio of NOx. The results are shown in Table 6.

Comparative Example 3

Example 6 was repeated except for using the exhaust gas cleaner without Ag or its oxide, and the removal ratio of NOx was measured under the same conditions as in Example 6. The results are shown in Table 6.

Comparative Example 4

Example 6 was repeated except for using the exhaust gas cleaner comprising $TiO_2$ pellets (density: 1 g/cm³) having the same shape as that of γ-alumina pellets used in Example 6, and the removal ratio of NOx was measured under the same conditions as in Example 6. The results are shown in Table 6.

TABLE 6

| | Removal Ratio of NOx at | | |
|---|---|---|---|
| No. | 350° C. | 400° C. | 450° C. |
| Ex. 6 | 45 | 55 | 42 |
| Com. Ex. 3 | 5 | 22 | 40 |
| Com. Ex. 4 | 20 | 25 | 30 |

Example 7

10 g of commercially available pellets made of γ-alumina (diameter: 1.5 mm, length: about 6 mm, specific surface area: 200 m²/g) were immersed in an aqueous solution of AgNO$_3$ (concentration: 0.035 g/ml), dried at 70° C. and heated at 150° C., 200° C., 300° C., 400° C. and 500° C. each for 2 hours in a nitrogen stream containing 5 volume % of hydrogen and finally at 500° C. for 2 hours in a nitrogen stream containing 10 volume % of oxygen, to obtain an exhaust gas cleaner in which 2 weight % (on a silver metal basis) of Ag was supported by the γ-alumina pellets.

The resulting exhaust gas cleaner was charged into a reactor, and a test gas having a composition shown in Table 7 below was caused to pass through the reactor at a rate of 2 liters per minute (in a normal state). While changing the temperature of the exhaust gas in the exhaust gas cleaner from 350° C. to 550° C., the added ethylene was caused to react with the nitrogen oxides in the exhaust gas.

TABLE 7

| Component | Concentration |
| --- | --- |
| Nitrogen monoxide | 500 ppm |
| Carbon Dioxide | 10 volume % |
| Oxygen | 10 volume % |
| Ethylene | 500 ppm |
| Nitrogen | Balance |
| Moisture | 10 volume % based on the total (100 volume %) of the above components. |

Figure 2:
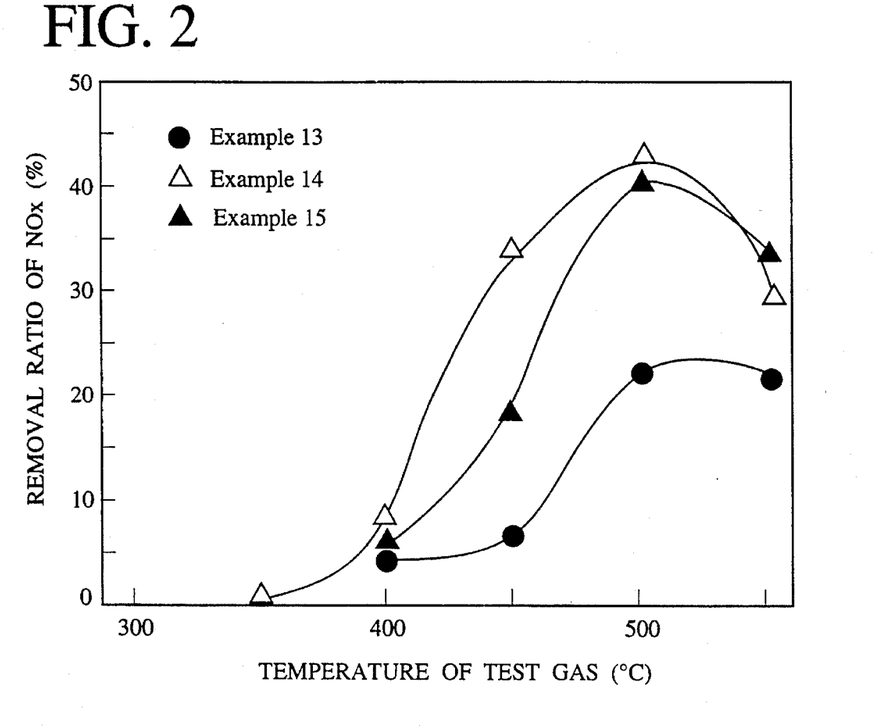
FIG. 2 is a graph showing the relation between the removal ratio of NOx and the temperature of the exhaust gas in Examples 7–9.

The concentration of NOx (sum of nitrogen monoxide and nitrogen dioxide) in the test gas which passed through the reactor was measured by a chemiluminescence analyzer to determine the removal ratio of NOx. The results are shown in FIG. 2.

Example 8

With the same exhaust gas cleaner as in Example 7, Example 7 was repeated by using the same test gas as shown in Table 7 except for containing propylene instead of ethylene to measure the removal ratio of NOx. The results are shown in FIG. 2.

Example 9

With the same exhaust gas cleaner as in Example 7, Example 7 was repeated by using the same test gas as shown in Table 7 except for containing propane instead of ethylene to measure the removal ratio of NOx. The results are shown in FIG. 2.

Comparative Example 5

Figure 3:
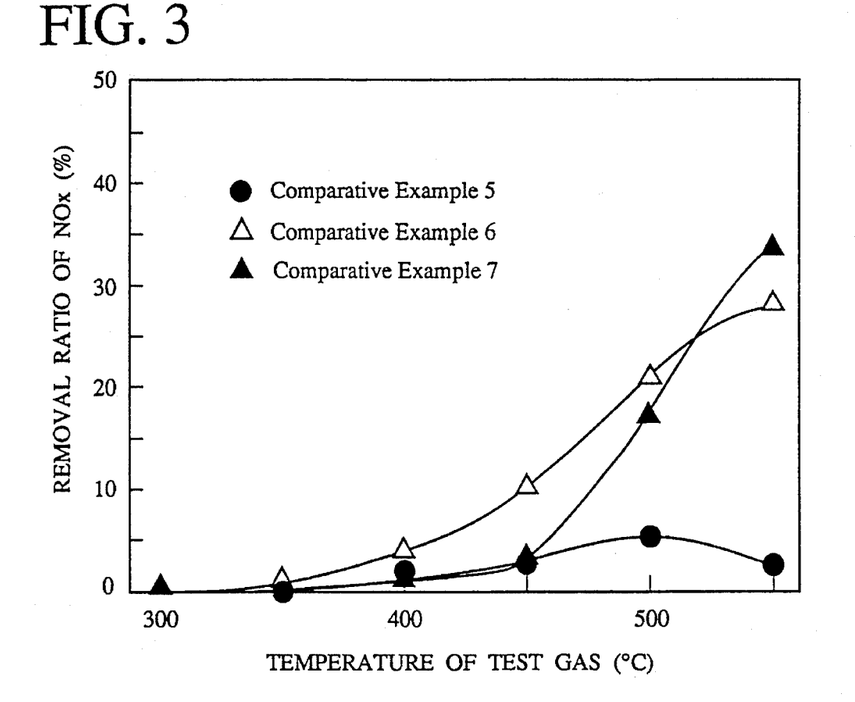
FIG. 3 is a graph showing the relation between the removal ratio of NOx and the temperature of the exhaust gas in Comparative Examples 5–7.

The same γ-Al$_2$O$_3$ pellets as in Example 7 were used without carrying Ag or its oxide, and Example 7 was repeated using the same test gas as shown in Table 7. The removal ratio of NOx was measured under the same conditions as in Example 7. The results are shown in FIG. 3.

Comparative Example 6

The same γ-Al$_2$O$_3$ pellets as in Example 7 were used without carrying Ag or its oxide, and Example 7 was repeated using the same test gas as shown in Table 7 except for containing propylene instead of ethylene. The removal ratio of NOx was measured under the same conditions as in Example 7. The results are shown in FIG. 3.

Comparative Example 7

The same γ-Al$_2$O$_3$ pellets as in Example 7 were used without carrying Ag or its oxide, and Example 7 was repeated using the same test gas as shown in Table 7 except for containing propane instead of ethylene. The removal ratio of NOx was measured under the same conditions as in Example 7. The results are shown in FIG. 3.

Example 10

Figure 4:
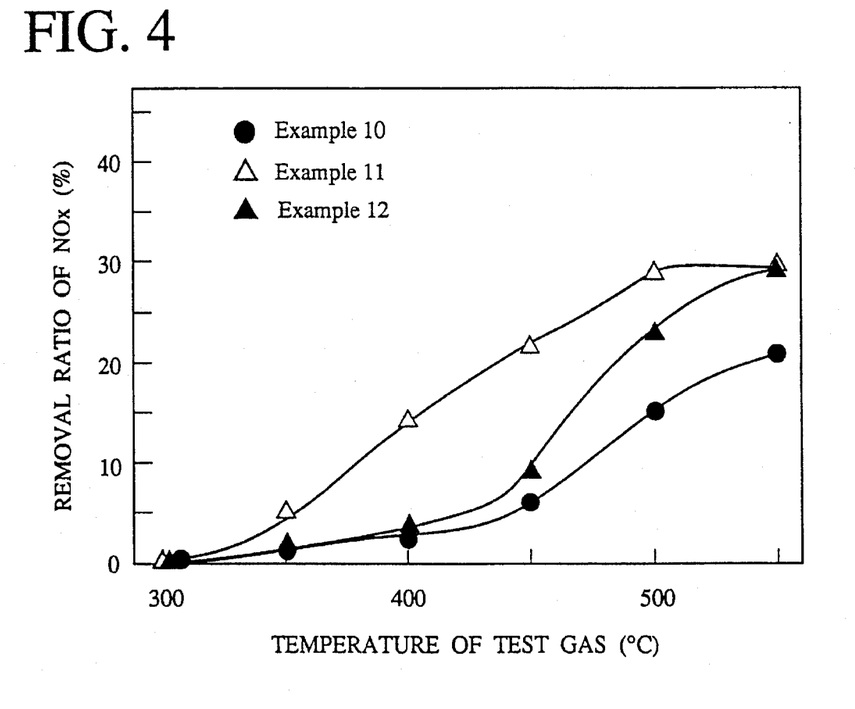
FIG. 4 is a graph showing the relation between the removal ratio of NOx and the temperature of the exhaust gas in Examples 10–12.

The same γ-Al$_2$O$_3$ pellets as in Example 7 were used with 0.5 weight % of Ag supported thereby, and Example 7 was repeated using the same test gas as shown in Table 7. The removal ratio of NOx was measured under the same conditions as in Example 7. The results are shown in FIG. 4.

Example 11

The same γ-Al$_2$O$_3$ pellets as in Example 7 were used with 0.5 weight % of Ag supported thereby, and Example 7 was repeated using the same test gas as shown in Table 7 except for containing propylene instead of ethylene. The removal ratio of NOx was measured under the same conditions as in Example 7. The results are shown in FIG. 4.

Example 12

The same γ-Al$_2$O$_3$ pellets as in Example 7 were used with 0.5 weight % of Ag supported thereby, and Example 7 was repeated using the same test gas as shown in Table 7 except for containing propane instead of ethylene. The removal ratio of NOx was measured under the same conditions as in Example 7. The results are shown in FIG. 4.

Example 13

Figure 5:
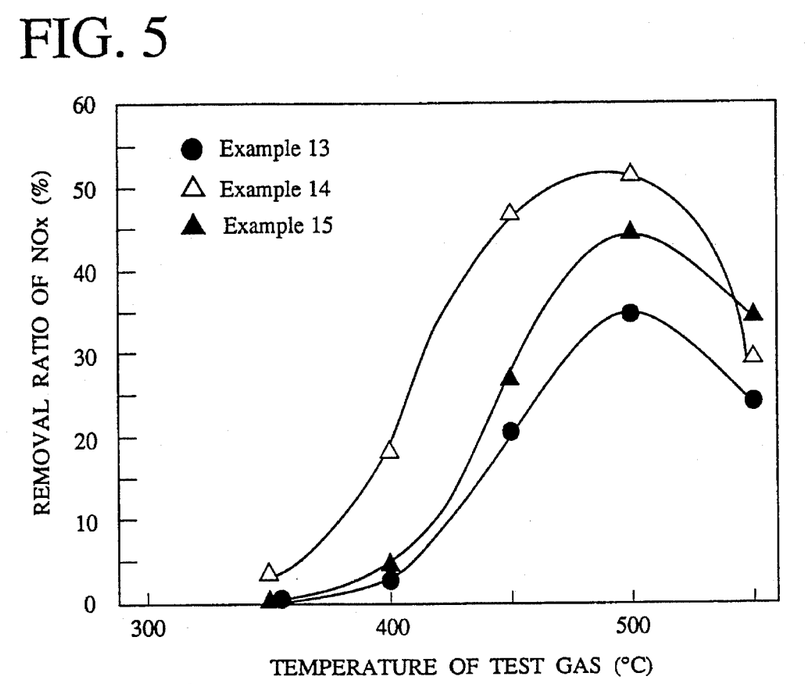
FIG. 5 is a graph showing the relation between the removal ratio of NOx and the temperature of the exhaust gas in Examples 13–15.

The same γ-Al$_2$O$_3$ pellets as in Example 7 were used with 4 weight % of Ag supported thereby, and Example 7 was repeated using the same test gas as shown in Table 7. The removal ratio of NOx was measured under the same conditions as in Example 7. The results are shown in FIG. 5.

Example 14

The same γ-Al$_2$O$_3$ pellets as in Example 7 were used with 4 weight % of Ag supported thereby, and Example 7 was repeated using the same test gas as shown in Table 7 except for containing propylene instead of ethylene. The removal ratio of NOx was measured under the same conditions as in Example 7. The results are shown in FIG. 5.

Example 15

The same γ-Al$_2$O$_3$ pellets as in Example 7 were used with 4 weight % of Ag supported thereby, and Example 7 was repeated using the same test gas as shown in Table 7 except for containing propane instead of ethylene. The removal ratio of NOx was measured under the same conditions as in Example 7. The results are shown in FIG. 5.

As is clear from FIGS. 2–5, the nitrogen oxides in the exhaust gas can be efficiently removed by using the exhaust gas cleaner of the present invention (Examples 7–15) at a temperature of 400°–550° C. On the other hand, those containing no Ag or its oxide in Comparative Examples 5–7 failed to remove the nitrogen oxides efficiently at a temperature of lower than 550° C.

Example 16

10 g of commercially available pellets made of γ-alumina (diameter: 1.5 mm, length: about 6 mm, specific surface area: 200 m$^2$/g) were immersed in an aqueous solution of AgNO$_3$ (concentration: 0.035 g/ml), dried at 70° C. and heated at 100° C., 125° C., 150° C. and 200° C. each for 2 hours and at 300° C. for 30 minutes in a nitrogen stream containing 5 volume % of hydrogen, and the hydrogen gas was purged with a nitrogen gas. Thereafter, the γ-alumina pellets were heated at 300° C., 400° C. and 500° C. each for 2 hours and at 550° C. for 5 hours in a nitrogen stream containing 10 volume % of oxygen, 10 volume % of moisture, and 10 volume % of carbon dioxide, to obtain an exhaust gas cleaner in which 2 weight % (on a silver metal basis) of Ag was supported by the γ-alumina pellets.

The resulting exhaust gas cleaner was charged into a reactor, and a test gas having a composition shown in Table 8 below was caused to pass through the reactor at a rate of 2 liters per minute (in a normal state). While changing the temperature of the exhaust gas in the exhaust gas cleaner from 200° to 600° C., the added ethanol was caused to react with the nitrogen oxides in the exhaust gas.

TABLE 8

| Component | Concentration |
|---|---|
| Nitrogen monoxide | 500 ppm |
| Carbon Dioxide | 10 volume % |
| Oxygen | 10 volume % |
| Ethanol | 500 ppm |
| Nitrogen | Balance |
| Moisture | 10 vol. % based on the total (100 vol. %) of the above components. |

The concentration of NOx (sum of nitrogen monoxide and nitrogen dioxide) in the test gas which passed through the reactor was measured by a chemiluminescence analyzer to determine the removal ratio of NOx. The results are shown in Table 9.

Comparative Example 8

Example 16 was repeated except for adding a test gas containing methanol instead of ethanol, and the removal ratio of NOx was measured under the same conditions as in Example 16. The results are shown in Table 9.

Comparative Example 9

The same γ-$Al_2O_3$ pellets as in Example 16 were used without carrying Ag, and Example 16 was repeated using such pellets. The removal ratio of NOx was measured under the same conditions as in Example 16. The results are shown in Table 9.

Example 17

With the same exhaust gas cleaner as in Example 16, Example 16 was repeated by using the same test gas as shown in Table 8 except for containing acetone (500 ppm) instead of ethanol to measure the removal ratio of NOx. The results are shown in Table 9.

Example 18

With the same exhaust gas cleaner as in Example 16, Example 16 was repeated by using the same test gas as shown in Table 8 except for containing acetic acid (500 ppm) instead of ethanol to measure the removal ratio of NOx. The results are shown in Table 9.

Example 19

With the same exhaust gas cleaner as in Example 16, Example 16 was repeated by using the same test gas as shown in Table 8 except for containing acetaldehyde (500 ppm) instead of ethanol to measure the removal ratio of NOx. The results are shown in Table 9.

Example 20

With the same exhaust gas cleaner as in Example 16, Example 16 was repeated by using the same test gas as shown in Table 8 except for containing 2-propanol (isopropyl alcohol) (333 ppm) instead of ethanol to measure the removal ratio of NOx. The results are shown in Table 9.

Example 21

With the same exhaust gas cleaner as in Example 16, Example 16 was repeated by using the same test gas as shown in Table 8 except for containing 1-propanol (n-propyl alcohol) (333 ppm) instead of ethanol to measure the removal ratio of NOx. The results are shown in Table 9.

Example 22

10 g of commercially available pellets made of γ-alumina (diameter: 1.5 mm, length: about 6 mm, specific surface area: 200 $m^2$/g) were immersed in an aqueous solution of $AgNO_3$ (concentration: 0.035 g/ml), dried at 70° C. and burned at 100° C., 125° C., 150° C. and 200° C. each for 2 hours and at 300° C. for 30 minutes in a nitrogen stream containing 50 volume % of hydrogen, and then the hydrogen gas was purged with a nitrogen gas. Thereafter, the γ-alumina pellets were heated at 300° C., 400° C. and 500° C. each for 2 hours and at 550° C. for 5 hours in a nitrogen stream containing 10 volume % of oxygen, 10 volume % of moisture, and 10 volume % of carbon dioxide, to obtain an exhaust gas cleaner in which 2 weight % (on a silver metal basis) of Ag was supported by the γ-alumina pellets.

With this exhaust gas cleaner, Example 16 was repeated by using the same test gas as shown in Table 8. The results are shown in Table 9.

TABLE 9

| No. | Additive | Removal Ratio (%) of NOx at | | | | | | | | |
|---|---|---|---|---|---|---|---|---|---|---|
| | | 200° C. | 250° C. | 300° C. | 350° C. | 400° C. | 450° C. | 500° C. | 550° C. | 600° C. |
| Ex. 16 | Ethanol | 40 | 76 | 92 | 92 | 87 | 78 | 63 | 45 | — |
| Ex. 17 | Acetone | 45 | 89 | 98.9 | 99.3 | 99.2 | 97.6 | 85 | 60 | — |
| Ex. 18 | Acetic Acid | — | 6 | 31 | 38 | 52 | 58 | 51 | 41 | 35 |
| Ex. 19 | Acetaldehyde | 36.9 | 67.2 | 76.9 | 76.8 | 72.7 | 64.4 | 48.5 | 21.8 | — |
| Ex. 20 | 2-Propanol | 55 | 94 | 98 | 98.5 | 97.0 | 86.6 | 88.3 | 46.2 | — |
| Ex. 21 | 1-Propanol | 58 | 79 | 82.5 | 75.3 | 65.6 | 56.7 | 44.9 | 30.0 | — |
| Ex. 22 | Ethanol | 48.6 | 86.7 | 95.2 | 90.4 | 84.2 | 75.6 | 60.7 | 40.5 | — |
| Com. Ex. 8 | Methanol | — | 15 | 12 | 12 | 6.5 | 3.1 | 1.6 | 1.3 | — |

TABLE 9-continued

| | | Removal Ratio (%) of NOx at | | | | | | | | |
|---|---|---|---|---|---|---|---|---|---|---|
| No. | Additive | 200° C. | 250° C. | 300° C. | 350° C. | 400° C. | 450° C. | 500° C. | 550° C. | 600° C. |
| Com. Ex. 9 | Ethanol | — | 9 | 27 | 11 | 6 | 6.6 | 10 | 28 | — |

As is clear from Table 9, the nitrogen oxides in the exhaust gas can be efficiently removed by the method of the present invention (Examples 16, 17 and 19) at a temperature of 200°–550° C. Efficient removal of nitrogen oxides was also achieved at 300°–600° C. in Example 18. In the temperature range of 250°–450° C., the removal ratio of nitrogen oxides was more than 75% in Examples 16 and 17. Further, in Examples 20 and 21, high efficiency of removing NOx can be obtained at 250°–500° C. Also, in Example 22 which used the exhaust gas cleaner heated in an atmosphere having a large hydrogen concentration, high removal ratio of NOx was achieved at a low temperature. On the other hand, those in Comparative Examples 8 and 9 failed to remove the nitrogen oxides efficiently.

Example 23

10 g of commercially available pellets made of γ-alumina (diameter: 1.5 mm, length: about 6 mm, specific surface area: 200 m$^2$/g) were immersed in an aqueous solution of AgNO$_3$ (concentration: 0.035 g/ml), dried at 70° C. and heated at 100° C., 125° C., 150° C. and 200° C. each for 2 hours and at 300° C. for 30 minutes in a nitrogen stream containing 5 volume % of hydrogen, and the hydrogen gas was purged with a nitrogen gas. Thereafter, the γ-alumina pellets were heated at 300° C., 400° C. and 500° C. each for 2 hours and at 550° C. for 5 hours in a nitrogen stream containing 10 volume % of oxygen, 10 volume % of moisture, and 10 volume % of carbon dioxide, to obtain an exhaust gas cleaner in which 2 weight % (on a silver metal basis) of Ag was supported by the γ-alumina pellets.

The resulting exhaust gas cleaner was brought into contact with a test gas shown in Table 10 mixed with 2 mmol of SO$_2$ for 1 hour. The SO$_2$-treated exhaust gas cleaner was charged into a reactor, and the test gas shown in Table 10 was caused to pass through the reactor at a rate of 2 liters per minute (in a normal state). While changing the temperature of the exhaust gas in the exhaust gas cleaner from 250° C. to 550° C., the added ethanol, which is an aliphatic oxygen-containing organic compound, was caused to react with the nitrogen oxides in the exhaust gas.

TABLE 10

| Component | Concentration |
|---|---|
| Nitrogen monoxide | 500 ppm |
| Carbon Dioxide | 10 volume % |
| Oxygen | 10 volume % |
| Ethanol | 500 ppm |
| Nitrogen | Balance |
| Moisture | 10 volume % based on the total (100 volume %) of the above components. |

The concentration of NOx (sum of nitrogen monoxide and nitrogen dioxide) in the test gas which passed through the reactor was measured by a chemiluminescence analyzer to determine the removal ratio of NOx. The results are shown in Table 11.

Example 24

Example 23 was repeated except for using a test gas containing propylene (500 ppm) instead of ethanol, and the removal ratio of NOx was measured under the same conditions as in Example 23. The results are shown in Table 11.

Example 25

10 g of commercially available γ-alumina powders (average particle diameter: 40 μm, specific surface area: 200 m$^2$/g) were immersed in an aqueous solution of AgNO$_3$, dried at 70° C. and heated at 100° C., 125° C., 150° C. and 200° C. each for 2 hours and at 300° C. for 30 minutes in a nitrogen stream containing 5 volume % of hydrogen to obtain γ-alumina powders supporting 2 weight % (on silver metal basis) of Ag. Then, a commercially available cordierite honeycomb filter (diameter: 30 mm, length: 35 mm, cell number: 400/inch$^2$) was coated with about 3 g of the above-obtained Ag-supporting γ-alumina powders by a known wash-coating method. Thereafter, the coated honeycomb filter was heated at 300° C., 400° C. and 500° C. each for 2 hours and at 550° C. for 5 hours in a nitrogen stream containing 10 volume % of oxygen, 10 volume % of moisture, and 10 volume % of carbon dioxide.

The resulting coated honeycomb filter was then treated with SO$_2$ in the same manner as in Example 23, whereby a SO$_2$-treated exhaust gas cleaner was obtained.

With this exhaust gas cleaner, the NOx removal test was conducted in the same manner as in Example 23. The results are shown in Table 11.

TABLE 11

| | | Removal Ratio (%) of NOx at | | | | | | |
|---|---|---|---|---|---|---|---|---|
| No. | Additive | 250° C. | 300° C. | 350° C. | 400° C. | 450° C. | 500° C. | 550° C. |
| Ex. 23 | Ethanol | 82.9 | 96.6 | 96.5 | 92.0 | 79.9 | 62.5 | 44.2 |
| Ex. 24 | Propylene | — | 16.0 | 29.7 | 60.7 | 66.9 | 64.1 | 43.2 |
| Ex. 25 | Ethanol | 82.0 | 95.0 | 96.0 | 92.3 | 80.0 | 63.0 | 45.0 |

As is clear from Table 11, the nitrogen oxides in the exhaust gas can be efficiently removed by using the exhaust gas cleaner treated with $SO_2$.

Example 26

10 g of commercially available pellets made of γ-alumina (diameter: 1.5 mm, length: about 6 mm, specific surface area: 200 $m^2/g$) were immersed in an aqueous solution of $AgNO_3$, dried at 70° C. and heated at 150° C., 200° C., 300° C., 400° C., 500° C. and 600° C. each for 2 hours in a nitrogen stream containing 5 volume % of hydrogen, and the hydrogen gas was purged with a nitrogen gas. Thereafter, the γ-alumina pellets were heated at 500° C. for 2 hours in a nitrogen stream containing 10 volume % of oxygen, to obtain an exhaust gas cleaner in which 6 weight % (on a silver metal basis) of Ag was supported by the γ-alumina pellets.

1.5 g of the resulting exhaust gas cleaner was charged into a reactor, and a test gas shown in Table 12 was caused to pass through the reaction pipe at a rate of 1.7 liters per minute (in a normal state). The contact time of the exhaust gas was 0.05 sec·g/ml. While changing the temperature of the exhaust gas in the exhaust gas cleaner from 300° to 600° C., the added propylene was caused to react with the nitrogen oxides in the exhaust gas.

TABLE 12

| Component | Concentration |
| --- | --- |
| Nitrogen monoxide | 800 ppm |
| Carbon Dioxide | 10 volume % |
| Oxygen | 10 volume % |
| Propylene | 1714 ppm |
| Nitrogen | Balance |
| Moisture | 10 volume % based on the total (100 volume %) of the above components. |

Figure 6:
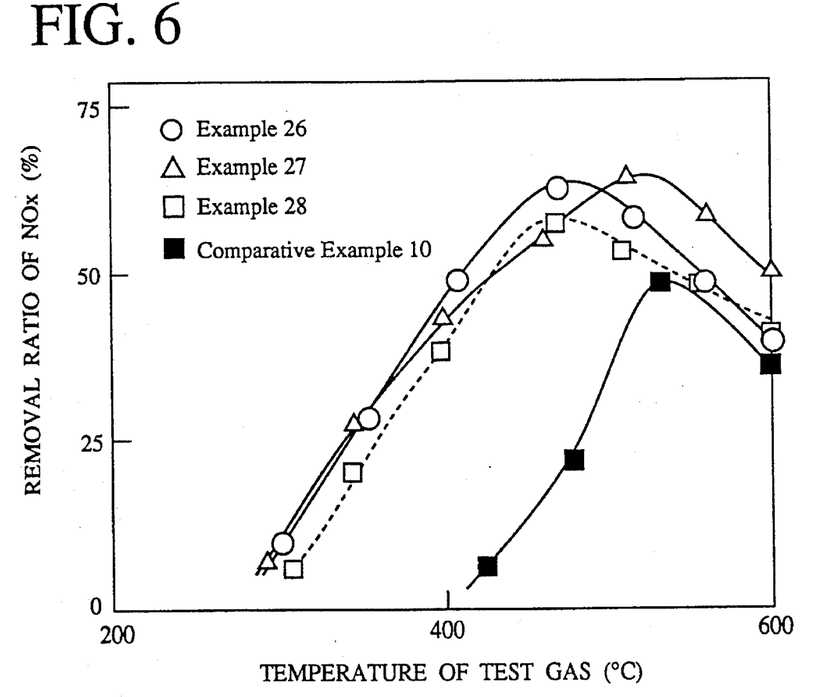
FIG. 6 is a graph showing the relation between the removal ratio of NOx and the temperature of the exhaust gas in Examples 26–28 and Comparative Example 10.

The concentration of NOx (sum of nitrogen monoxide and nitrogen dioxide) in the test gas which passed through the reactor was measured by a chemiluminescence analyzer to determine the removal ratio of NOx. The results are shown in FIG. 6.

Example 27

Example 26 was repeated except for using the γ-$Al_2O_3$ pellets carrying 8 weight % of Ag, and the removal ratio of NOx was measured under the same conditions as in Example 26. The results are shown in FIG. 6.

Example 28

10 g of commercially available γ-alumina powders (average particle diameter: 40 μm, specific surface area: 200 $m^2/g$) were immersed in an aqueous solution of $AgNO_3$, dried at 70° C. and heated at 150° C., 200° C., 300° C., 400° C., 500° C. and 600° C. each for 2 hours in a nitrogen stream containing 5 volume % of hydrogen to obtain γ-alumina powders supporting 5 weight % (on silver metal basis) of Ag. Then, a commercially available cordierite honeycomb filter (diameter: 30 mm, length: 12.5 mm, cell number: 400/$inch^2$) was coated with about 1 g of the above-obtained Ag-supporting γ-alumina powders by a known wash-coating method. Thereafter, the coated honeycomb filter was heated at 600° C. for 2 hours in a nitrogen stream containing 10 volume % of oxygen to obtain an exhaust gas cleaner.

With this exhaust gas cleaner, the NOx removal test was conducted in the same manner as in Example 26 except for causing the test gas to pass through the reaction pipe at a rate of 4.4 liters per minute (space velocity: 30000 $h^{-1}$). The results are shown in FIG. 6.

Comparative Example 10

The same γ-$Al_2O_3$ pellets as in Example 26 were used without carrying Ag, and Example 26 was repeated using the same test gas as shown in Table 12. The removal ratio of NOx was measured under the same conditions as in Example 26. The results are shown in FIG. 6.

As is clear from FIG. 6, the nitrogen oxides in the exhaust gas can be efficiently removed by using the exhaust gas cleaner of the present invention (Examples 26–28) at a temperature of 300°–600° C. On the other hand, those containing no Ag in Comparative Example 10 failed to remove the nitrogen oxides efficiently at a temperature of lower than 500° C.

As described above in detail, by the exhaust gas cleaning method according to the present invention, NOx can efficiently be removed from the exhaust gas at a temperature of 200°–600° C., even when the exhaust gas contains about 10% of moisture.

The method of the present invention is effective for cleaning exhaust gases such as those discharged from diesel engines, which have high oxygen concentrations.

What is claimed is:

1. A method of cleaning an exhaust gas containing nitrogen oxides and oxygen in an amount larger than its stoichiometric amount relative to unburned components in said exhaust gas, which consists essentially of:

(a) disposing an exhaust gas cleaner in a flow path of said exhaust gas, said exhaust gas cleaner consisting essentially of a heat-resistant, porous inorganic oxide body made of alumina or a composite oxide thereof and impregnated with a catalytically active component consisting essentially of Ag or its oxide, said exhaust gas cleaner being subjected to a treatment with $SO_2$ prior to contact with said exhaust gas by contacting said exhaust gas cleaner with a gas containing $SO_2$ and an aliphatic oxygen-containing organic compound so that 0.02–1 mmol of $SO_2$ is brought into contact per 1 g of said exhaust gas cleaner;

(b) introducing a reducing agent selected from the group consisting of hydrocarbons having 2 or more carbon atoms and aliphatic oxygen-containing organic compounds into a stream of said exhaust gas on the upstream side of said exhaust gas cleaner; and (c) bringing the exhaust gas containing said reducing agent into contact with said exhaust gas cleaner at a temperature of 200°–600° C., to cause a reaction between said nitrogen oxides and said reducing agent, thereby removing said nitrogen oxides.

2. A method according to claim 1, wherein said aliphatic oxygen-containing organic compound is ethanol.

3. The method of cleaning an exhaust gas according to claim 1, wherein said hydrocarbon is a gaseous hydrocarbon at a weight ratio of 0.2–4 to said nitrogen oxides.

4. The method of cleaning an exhaust gas according to claim 1, wherein said hydrocarbon is a liquid hydrocarbon at a weight ratio of 0.2–5 to said nitrogen oxides.

5. The method of cleaning an exhaust gas according to claim 1, wherein a contact time of said exhaust gas with said exhaust gas cleaner is 0.3 sec·g/ml or less.

\* \* \* \* \*